(12) United States Patent
Laudic et al.

(10) Patent No.: US 6,543,675 B1
(45) Date of Patent: Apr. 8, 2003

(54) METHOD FOR SOLDERING AN EXHAUST GAS HEAT EXCHANGER

(75) Inventors: Hélène Laudic, Le Pecq (FR); Benjamin Gracia, Zaragosa (ES)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/701,491

(22) PCT Filed: Feb. 22, 2000

(86) PCT No.: PCT/FR00/00436
§ 371 (c)(1),
(2), (4) Date: Jun. 14, 2002

(87) PCT Pub. No.: WO00/50195
PCT Pub. Date: Aug. 31, 2000

(30) Foreign Application Priority Data

Feb. 23, 1999 (FR) ............................................. 99 02242

(51) Int. Cl.⁷ .......................... B23K 31/02; B23K 35/12
(52) U.S. Cl. ....................... 228/183; 228/246; 228/250; 228/253
(58) Field of Search .............................. 228/183, 245, 228/246, 252, 253, 250, 249, 254, 255; 165/153, 149, 175

(56) References Cited

U.S. PATENT DOCUMENTS

| | | | | |
|---|---|---|---|---|
| 3,710,473 A | * | 1/1973 | McElwain et al. | 29/890.038 |
| 3,914,861 A | * | 10/1975 | Phillips | 29/600 |
| 4,192,052 A | * | 3/1980 | MacDonald | 29/890.046 |
| 4,801,072 A | * | 1/1989 | Henschel | 228/245 |
| 5,110,035 A | | 5/1992 | Reynolds, Jr. et al. | |
| 5,150,520 A | | 9/1992 | Derisi | |
| 5,464,145 A | * | 11/1995 | Park et al. | 228/183 |
| 5,464,146 A | * | 11/1995 | Zaluzec et al. | 228/208 |
| 5,617,992 A | * | 4/1997 | Huddleston et al. | 228/183 |
| 5,622,220 A | | 4/1997 | Park et al. | |
| 5,711,369 A | * | 1/1998 | Huddleston et al. | 165/79 |

\* cited by examiner

*Primary Examiner*—Tom Dunn
*Assistant Examiner*—Colleen P. Cooke
(74) *Attorney, Agent, or Firm*—Liniak, Berenato & White

(57) ABSTRACT

The invention concerns a method whereby a soldering joint is applied on one of the surfaces of a collector plate (2, 3) before inserting the ends of the tube to be assembled thereto, in the form of a flexible adhesive previously perforated to correspond to the holes (20) of the plate.

13 Claims, 1 Drawing Sheet

METHOD FOR SOLDERING AN EXHAUST GAS HEAT EXCHANGER

The invention concerns a method for assembling in a fluidtight manner, by soldering, a header plate delimiting a heat exchange fluid box and a multiplicity of parallel elongate tubes whose ends pass through respective holes in the said header plate to allow communication of fluid between the inside of the tubes and the inside of the fluid box, a method in which a solder is made to melt in order to provide a fluidtight connection between the periphery of each hole and the external surface of the corresponding tube.

Such a method is used in particular for assembling a heat exchanger intended for the exchange of heat between the exhaust gases of a vehicle, circulating outside the tubes, and a cooling fluid circulating inside the tubes, an exchange of heat which makes it possible to use some of the heat energy from the exhaust gases for heating the passenger compartment of the vehicle.

In this type of exchanger, in order to resist the corrosive nature of the exhaust gases, the parts are made from stainless steel and the solder is based on nickel.

Various techniques are used for applying this solder. One of them consists of depositing drops of solder in a viscous state on the header plate with a syringe, after fitting the tubes and close to these. Other techniques consist of soaking the ends of the tubes, assembled in a bundle, in a liquid containing the solder, or spraying the solder with a gun in the powder state on the ends of the tubes in the bundle, or on the header plate before fitting the tubs. All these techniques require manipulations which are complex and sometimes tricky and do not allow good control of the quantity of solder applied or a good seal between the tubes and the header plate.

The aim of the invention is to remedy these drawbacks.

The invention relates notably to a method of the type defined in the introduction, and provides for the solder to be applied to at least one of the faces of the header plate, before insertion of the ends of the tubes, in the form of a flexible adhesive sheet previously perforated in correspondence with the holes in the plate.

Such adhesive sheets of solder, notably based on nickel, are currently commercial available, for example in the form of strips provided with protective films, and are used for assembling parts having continuous respective surfaces which are applied against each other with the interposing of the sheet of solder.

Other optional characteristics of the invention, complementary or alternative, are set out below:

The contour of the perforations of the sheet of solder coincides substantially with that of the holes in the header plate.

The perforations in the sheet of solder are smaller than the holes in the header plate.

The perforations in the sheet of solder have substantially the same shape and the same centre as the holes in the header plate.

The contour of a perforation in the sheet of solder has common points with that of the corresponding hole in the header plate, and is for the remainder situated inside the contour of the hole.

The contour of the perforation moves progressively away from that of the hole as from the common point.

The contour of the perforation moves away abruptly, by means of a step, from that of the hole as from a common point.

The contour of the perforation, between two steps, remains at a substantially constant distance inside that of the hole.

With each perforation in the sheet of solder there is associated a collar formed by conjoint cropping and deformation of the sheet and extending substantially in the longitudinal direction of the tube as from the said sheet.

The starting point is a sheet of solder having an adhesive face and provided with a protective film at least on the said adhesive face, and the sheet is cropped in order to adapt it to the shape of the header plate and to produce the perforations, before removing the protective film and applying the sheet to the header plate.

The sheet is provided with a second protective film opposite to the said adhesive face, which is removed after application of the sheet and before melting of the solder.

The tubes are fitted by causing them to pass through the holes in the said header plate covered by the sheet.

The solder is based on nickel.

The header plate and the tubes are made from stainless steel.

The characteristics and advantages of the invention will be disclosed in more detail in the following description, referring to the accompanying drawings.

Figure 1:
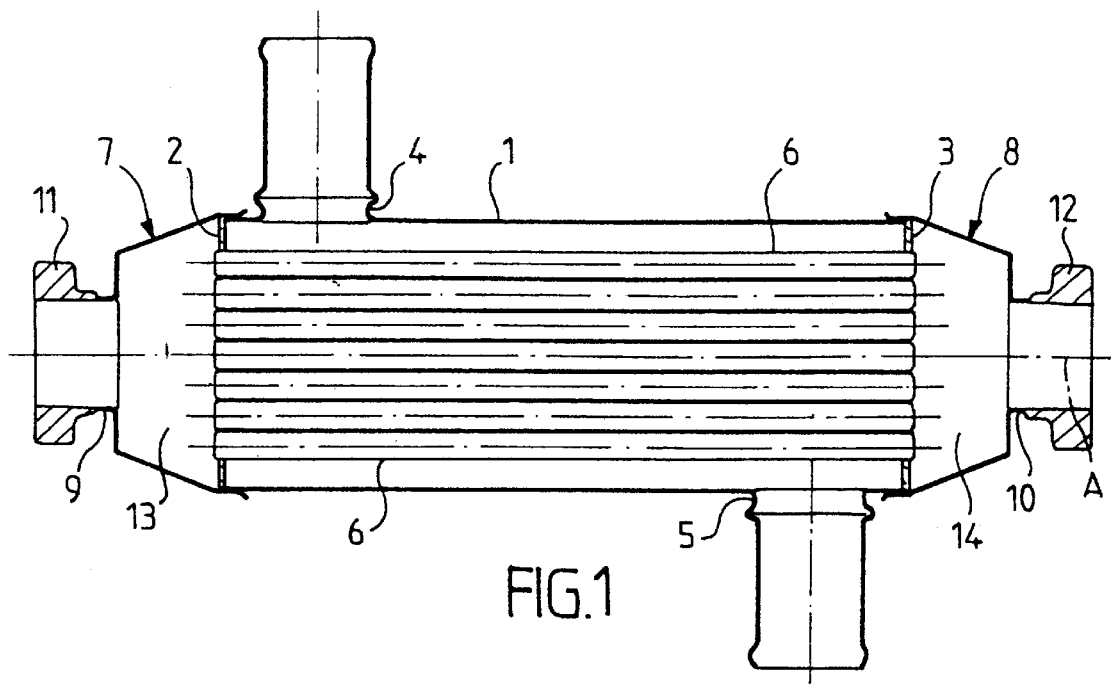
FIG. 1 is a view in axial section of a heat exchanger according to the invention for the recovery of heat from the exhaust gases of a motor vehicle.

The heat exchanger depicted in FIG. 1 comprises, in a manner known per se, a central housing, cylindrical in shape, composed of a cylindrical peripheral wall 1 and two circular end walls 2, 3 forming header plates. Inlet and outlet manifolds 4, 5 for the vehicle engine cooling fluid are provided on the wall 10, at diametrically opposed positions, one close to the plate 2 and the other close to the plate 3. Circular holes distributed over the surface of the plates 2 and 3 receive the ends of elongate tubes 6 parallel to the axis A of the housing. Two annular dishes 7, 8, formed by revolution about the axis A, respectively cover the ends of the housing and terminate, opposite to the latter, in axial manifolds 9, 10 which are soldered respectively to flanges 11, 12 intended for fixing the heat exchanger to the vehicle. The walls 1–3, the tubes 6, the dishes 7, 8 and the flanges 11, 12 are mutually connected by soldering in a fluidtight manner. The exhaust gases enter through the manifold 9 into the header box 13 delimited by the plate 2 and the dish 7, pass inside the tubes 6 in order to reach the header box 14 delimited by the plate 3 and the dish 8, and leave through the manifold 10. The cooling fluid enters through the manifold 4 inside the housing 1–3, where it passes, sweeping the external surface of the tube so as to collect the heat from the gases circulating inside the latter, and then leaves through the manifold 5. The circulation of each fluid can also be effected in the reverse direction to that which has just been described. The header plates 2, 3, the tubes 6, the dishes 7, 8 and the flanges 10, 12, in contact with the exhaust gases, are made of stainless steel.

Figure 2:
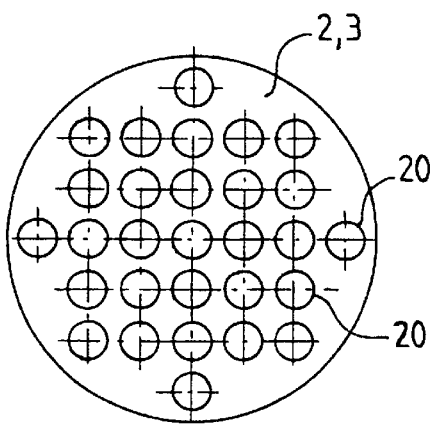
FIG. 2 is a view in elevation of a header plate of the heat exchanger of FIG. 1.

The circular header plates 2, 3 are identical to each other and the circular holes 20 for passage of the tubes are evenly distributed over their surface, for example in a network with square meshes, as shown in FIG. 2.

Figure 3:
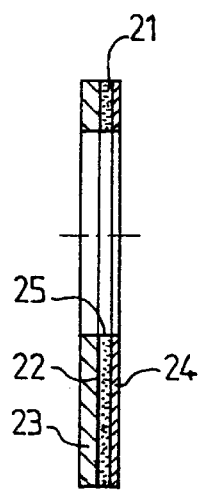
FIG. 3 is a partial view in transverse section of a sheet of solder intended to be applied to the plate in FIG. 2, after perforation and before removal of the protective films.

FIG. 3 is a partial view in section of a flexible laminated slug cut to the dimensions of the plate 2, 3, comprising a sheet 21 of solder based on nickel, covered on one 22 of its faces with a layer of adhesive and a protective film 23, and on its opposite face with a protective film 24. FIG. 3 shows one of the perforations 25 provided in the laminated slug 21–24, in correspondence with the holes 20. The perforations 25 can be produced by punching, at the same time as the cropping of the contour of the slug. Before applying the sheet 21 to the plate 2, 3, it remains to remove the film 23 in order to expose the adhesive. The film 24 is then removed, before passing to the soldering oven.

Figure 4:
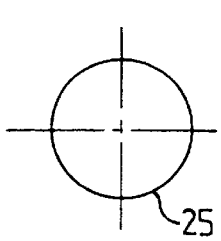
FIGS. 4 to 7 show different possible shapes for the perforations in the sheet of solder, and their arrangement with respect to the holes in the header plate.
Figure 5:
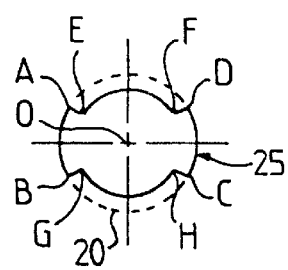
Figure 6:
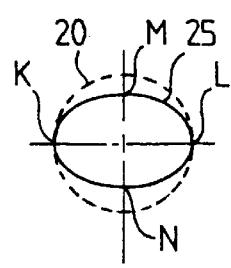

FIGS. 4 to 6 show four possible forms for perforations 25 associated with circular holes 20 which are to receive tubes with a cross-section which is also circular.

In FIG. 4, the perforation 25 is circular and has the same diameter as the hole 20, its contour coming to coincide entirely with that of the hole.

In FIG. 5, the contour of the perforation comprises two arcs AB and CD, diametrically opposite to each other, of a circle coinciding with the contour of the hole 20, and two arcs EF and GH, diametrically opposite to each other, of a circle with a smaller diameter than the previous one and with the same centre O, the ends of the arcs of the second circle being connected to those of the arcs of the first circle by substantially radial segments forming steps AE, BG, CH and DF.

In FIG. 6, the contour of the perforation 25 has the shape of an ellipse whose large diameter KL coincides with a diameter of the hole 20. The contour 25 therefore moves away progressively towards the inside of that of the hole 20 from each of the ends KL of its large diameter to each of the ends MN of its small diameter.

Figure 8:
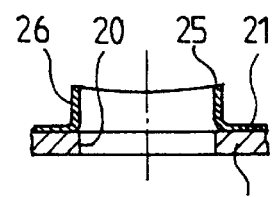
FIG. 8 is a partial view of the header plate and of the sheet of solder, in section along the line VIII—VIII in FIG. 7.
Figure 7:
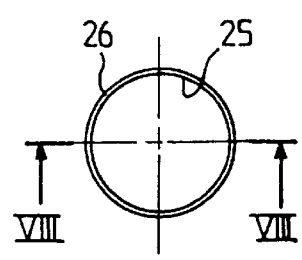

As a variant, as shown in FIGS. 7 and 8, with each hole 20 in the plate 2, 3 there can be associated a collar 26 formed, at the same time as the perforation 25, by cropping and deformation of the sheet 21. The collar 26 extends substantially perpendicularly to the plane of the header plate 2, 3, that is to say parallel to the axis of the tube.

The shapes of the perforations illustrated in FIGS. 5 and 6, which are merely examples of the many shapes possible, possibly adapted to non-circular holes and tubes, make it possible to optimise the contact between the solder and the tubes whilst avoiding tearing the sheet of solder when the tubes are inserted. The collar in FIGS. 7 and 8 has the same function.

In a variant which is not illustrated, the contour of the perforation is situated entirely inside the contour of the hole, the distance between these being able to be substantially uniform, for example in the case of a perforation and a hole which are circular and concentric, or on the contrary variable.

What is claimed is:

1. Method for assembling in a fluidtight manner, by soldering, a header plate (2, 3) delimiting a heat exchange fluid box (13, 14) and a multiplicity of parallel elongate tubes (6) whose ends pass through respective holes (20) in said header plate to allow communication of fluid between the inside of the tubes and the inside of the fluid box, in which a solder is made to melt in order to provide a fluidtight connection between the periphery of each hole and the external surface of the corresponding tube, characterised in that the solder is applied to at least one of the faces of the header plate, before insertion of the ends of the tubes, in the form of a flexible adhesive sheet (21) previously perforated (25) in correspondence with the holes (20) in the plate.

2. Method according to claim 1, characterised in that the contour of the perforations of the sheet of solder coincides substantially with that of the holes in the header plate.

3. Method according to claim 1, characterised in that the perforations (25) in the sheet of solder are smaller than the holes (20) in the header plate.

4. Method according to claim 3, characterised in that the perforations in the sheet of solder have substantially the same shape and the same centre as the holes in the header plate.

5. Method according to claim 3, characterised in that the contour of a perforation in the sheet of solder has common points (AB, CD) with that of the corresponding hole in the header plate, and is for the remainder situated inside the contour of the hole.

6. Method according to claim 5, characterised in that the contour of the perforation moves progressively away from that of the hole as from the common point (K, L).

7. Method according to claim 5, characterised in that the contour of the perforation moves away abruptly, by means of a step (AE, BG, CH, DF), from that of the hole as from a common point (A, B, C, D).

8. Method according to claim 7, characterised in that the contour of the perforation, between two steps (AE, DF), remains at a substantially constant distance inside that of the hole.

9. Method according to claim 1, characterised in that with each perforation (25) in the sheet of solder there is associated a collar (26) formed by conjoint cropping and deformation of the sheet (21) and extending substantially in the longitudinal direction of the tube as from the said sheet.

10. Method according to claim 1, characterised in that the starting point is a sheet of solder (21) having an adhesive face (22) and provided with a protective film (23) at least on the said adhesive face, and in that the sheet is cropped in order to adapt it to the shape of the header plate and to produce the perforations (25), before removing the protective film and applying the sheet to the header plate.

11. Method according to claim 10, characterised in that the sheet is provided with a second protective film (24) opposite to the said adhesive face, which is removed after application of the sheet and before melting of the solder.

12. Method according to claim 1, characterised in that the tubes are fitted by causing them to pass through the holes in the said header plate covered by the sheet.

13. Method according to claim 1, characterised in that the solder is based on nickel.

* * * * *